Feb. 13, 1951 G. D. McVICKER 2,541,529
ACTUATOR FOR POWER OPERATED ADJUSTABLE BEDS
Filed June 6, 1949 2 Sheets-Sheet 2
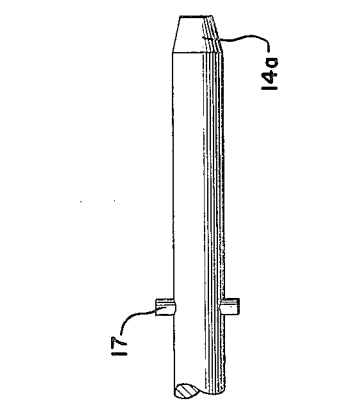
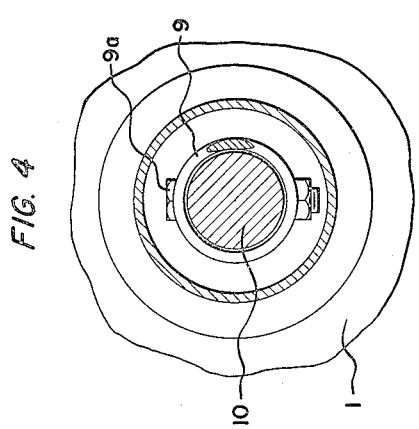
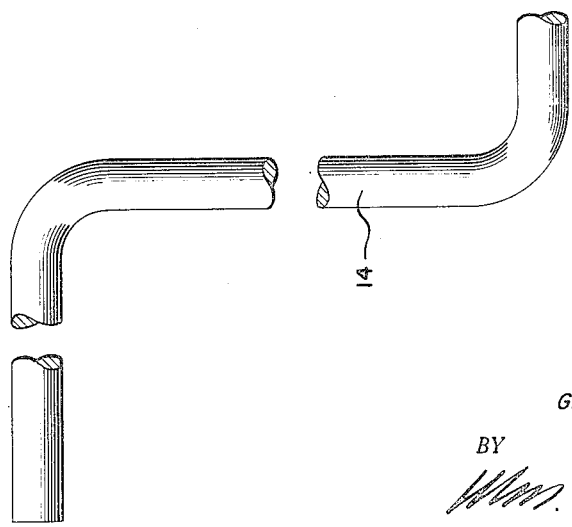
INVENTOR.
GRAHAM D. McVICKER
BY
AGENT Patented Feb. 13, 1951

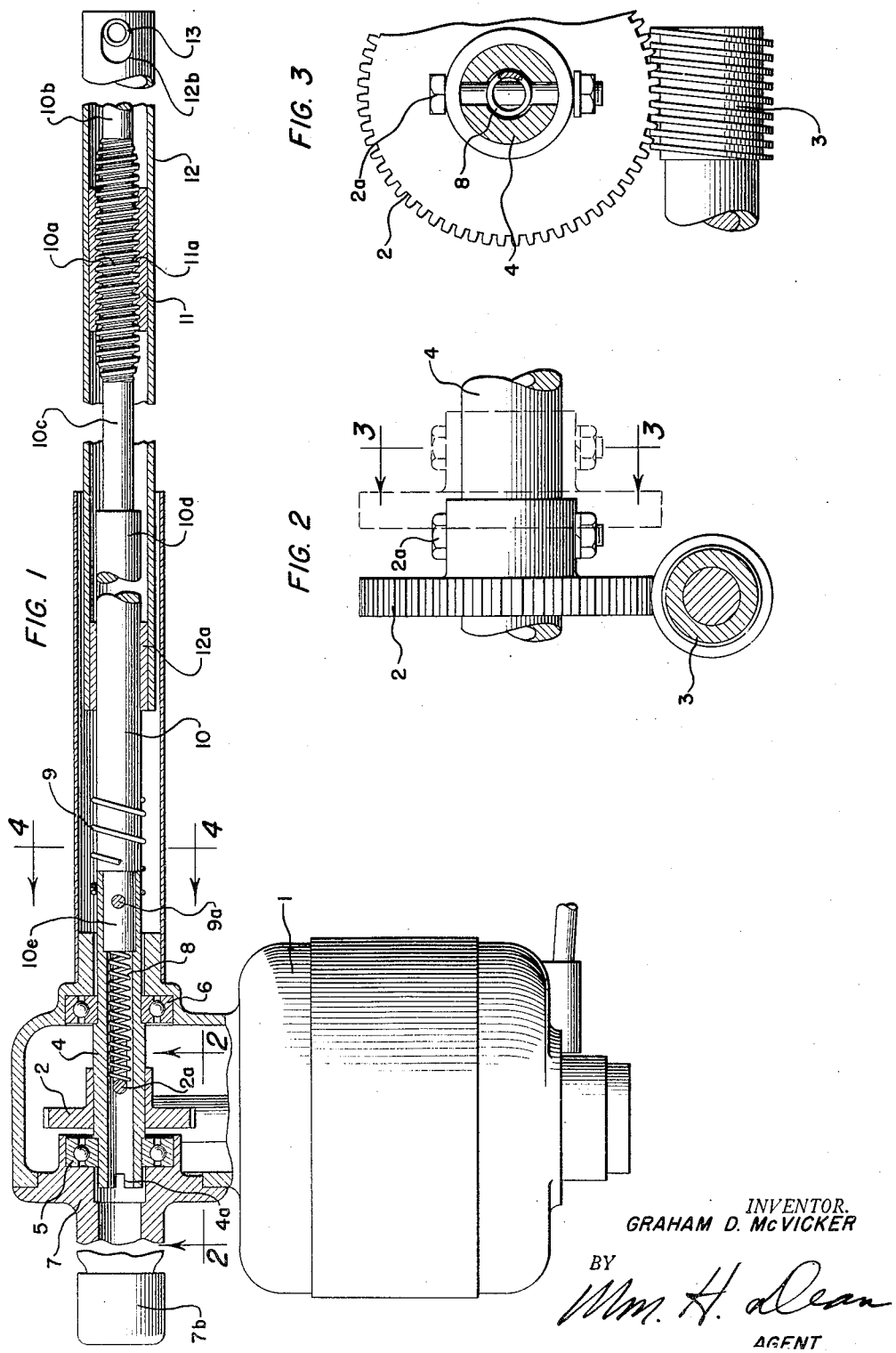

2,541,529

UNITED STATES PATENT OFFICE 2,541,529

ACTUATOR FOR POWER-OPERATED ADJUSTABLE BEDS

Graham D. McVicker, San Diego, Calif.

Application June 6, 1949, Serial No. 97,464

5 Claims. (Cl. 74—424.8)

My invention relates to an actuator for power operated adjustable bed, more particularly to an improvement over my former patent applications, Serial No. 632,692, filed December 4, 1945, and Serial No. 17,304, filed March 26, 1948, and the objects of my invention are:

First, to provide an actuator for power operated adjustable bed of this class having novel jack extension limiting means, wherein the major diameter of the jack screw threads at opposite ends thereof is tapered longitudinally of the axis of the screw, and the corresponding jack nut is internally tapered in conforming relationship therewith, permitting the nut to run out on the screw and maintain considerable longitudinal bearing for the support of bed mechanism by the jack when the helical threads are substantially disengaged;

Second, to provide an actuator for power operated adjustable bed having a helical jack screw, the opposite ends of which the major diameter thereof is tapered longitudinally of the axis of the screw, permitting the tapered portion of the major diameter of the threads to engage an internally tapered internally screw threaded bore portion in either end of the nut, corresponding thereto, permitting the nut to sustain considerable load longitudinally of the screw when the threads of the nut and screw are disengaged, and providing for positive helical engagement and meshing of the nut and the screw when turned in a direction tending to cause engagement of the nut and screw;

Third, to provide an actuator for power operated adjustable bed of this class having jack screw movement limiting means, which substantially eliminates the necessity for complicated electrical limit switch circuits for controlling the limits of movement of the mechanical jack of said power operated adjustable bed adapted to elevate and lower certain portions of the bed;

Fourth, to provide an actuator for power operated adjustable bed of this class having jack means in connection therewith which provides an audible signal when the jack has reached its travel limit in either direction;

Fifth, to provide a jaw screw and nut which automatically provides for certain reciprocal amplitude of jack screw operation in either direction longitudinally of the axis of the screw;

Sixth, to provide a jack screw and nut having corresponding diametrical taper and a compression spring for maintaining the nut at its one diametrically tapered portion in engagement with the externally diametrically tapered portion of the screw, whereby positive engagement with the screw is maintained for initiation of the operation of the screw in the nut;

Seventh, to provide an actuator for power operated adjustable bed of this class having a slotted actuator member adapted to permit certain travel of the actuator member over an actuator pin, permitting the electric motor in connection with the actuator to gain normal speed without load preliminary to the application of the full working load thereto; and Eighth, to provide an actuator for power operated adjustable bed of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a fragmentary side elevational view of my actuator for power operated adjustable bed, showing parts and portions in section to amplify the illustration; Fig. 2 is an enlarged fragmentary sectional view, taken from the line 2—2 of Fig. 1; Fig. 3 is a fragmentary sectional view, taken from the line 3—3 of Fig. 2; Fig. 4 is an enlarged fragmentary sectional view, taken from the line 4—4 of Fig. 1; and Fig. 5 is a fragmentary side elevational view of the manual operating handle of my actuator for power operated adjustable bed, showing the same in the power actuator casing, illustrated fragmentarily and in section.

Similar characters of reference refer to similar parts and portions throughout the several views of the drawings.

The motor 1, gear 2, pinion 3, shaft 4, bearings 5 and 6, casing cap 7, springs 8 and 9, jack screw 10, nut 11, actuator member 12, actuator pin 13, crank 14, crank bearing 15, bearing support 16, pin 17 and the collars 18 and 19 constitute the principal parts and portions of my actuator for power operated adjustable bed.

The motor 1, gear 2, pinion 3, shaft 4, bearings 5 and 6, casing cap 7 and the spring 8, are all conventional structures, substantially the same as disclosed in the application hereinbefore referred to, Serial No. 17,304, filed March 26, 1948.

The jack screw 10 is provided with an externally helically screw-threaded portion 10a, at opposite ends of which straight shaft portions 10b and 10c are integral, and which substantially conform to the minor diameter of the external screw threads 10a, with slight tolerance, so that the shaft portions 10c and 10b will slidably pass through the minor diameter of the internal threads 11a of the nut 11, which is fixed internally of the tubular actuator member 12. The major diameter of the screw threaded portion 10a of the jack screw 10 tapers toward each opposite end of the externally threaded portion 10a, as shown in Fig. 1 of the drawings, and the internally screw threaded bore portion of the nut 11 having the threads 11a therein is tapered from the minor diameter of the threads 11a to the major diameter thereof, outwardly toward each open end of the bore portion of said nut 11. It will be noted that the internally tapered bore portion, at opposite ends of the nut 11, substantially coincide in angular taper to the externally tapered major diameter of opposite ends of the externally screw threaded portion 10a of the jack screw 10.

It will be noted that the actuator member 12 is provided with a bushing 12a therein, slidably fitted over an enlarged shaft portion 10d of the jack screw 10, for engagement with the spring 9, which is abutted to the bolt 9a, which extends through the end of the shaft 4 and the telescopically mounted end 10e of the jack screw 10. The actuator member 12 is provided with a longitudinally slotted portion 12b in its side wall, near one end, engageable with the pin 13, which is an actuator pin secured to movable structure of a conventional adjustable hospital bed, or the like.

As shown in Fig. 5 of the drawings, I have provided certain improvements in the manually operated handle structure, wherein the handle 14 is provided with a pair of collars 18 and 19, fixed thereon in spaced relationship with each other, whereby the collar 18 engages the bearing 15 and the collar 19 maintains the bearing support 16 in adjacent relationship with the bearing 15. This bearing support 16 is a cup-shaped support, having internal screw threads 16a, engageable with external screw threads 7a of the casing cap 7, and this bearing support 16 replaces the casing cap bore cover 7b, all as shown best in Figs. 1 and 5 of the drawings. The handle 14 is provided with a pin 17, extending therethrough, which is placed in spaced relationship to the frusto-conical end portion 14a of the handle 14, which is insertable into engagement with the bolt 2a connected to the gear 2.

The hollow shaft 4, as shown in Fig. 1 of the drawings, is improved by the provision of notch portions 4a in the end thereof for receiving the opposed projecting ends of the pin 17, disclosed in Fig. 5 of the drawings.

The operation of my actuator for power operated adjustable bed is substantially as follows:

When the motor 1 is operated in the conventional manner by electrical switches controlled by the patient or the nurse in charge of a patient, the jack screw 10 is operated until the nut 11 completely traverses the same and reaches the end thereof, which correspondingly extends the actuator member 12 and elevates or lowers a portion of the adjustable bed to which the actuator is connected. It will be noted that when the motor 1 is started, the slot 12b provides free play of the actuator member 12 before it engages the pin 13 in either direction, so that the motor 1 may attain a certain speed before fully engaging the load, whereby the requirement for high starting torque of the motor is substantially reduced. After the motor has started the load, as hereinbefore described, by forcing the nut 11 into disengaged relationship with one end of the screw threaded portion 10a of the jack screw 10, the conforming tapered portions of the nut 11 and one end of the jack screw threaded portion 10a provides for the support of considerable load by the screw 10 in engagement with the nut 11.

It is to be noted that the internally tapered screw threaded bore portion at each end of the nut 11 provides positive seat for one diametrically tapered end of the externally screw threaded portion of the jack screw 10, and that continued rotation of the jack screw 10 causes the threaded portions to cause a slight clicking sound, which provides an audible warning to the operator that the jack is fully extended. Wear of the tapered portion of the screw threaded portion 10a, and its corresponding internally tapered portion of the nut 11, does not in any way affect the meshing relationship of the corresponding threads of the nut 11 and the screw 10, due to the fact that the wear takes place on the diametrically tapered portions thereof and does not affect the approach to the lead of the screw and its corresponding thread internally of the nut 11.

When the nut 11, together with the actuator member 12, have been retracted toward the motor 1, causing the bushing 12a to engage the spring 9, certain tension of the spring 9 maintains constant engagement of the nut 11 with the screw 10, so that operation in the extending direction of the actuator member 12 is automatic and without lag or delay. When the actuator member 12 is fully extended from the motor 1, it is normally under load, and therefore the nut 11 is maintained in positive engagement with the threads 10a of the jack screw 10, whereby the threads readily helically engage when the motor is reversed for retracting the actuator member 12.

When the source of electrical energy to the motor 1 fails, the cover 7b, as shown in Fig. 1 of the drawings, is removed, and the bearing support 16 is placed in screw threaded relationship with the casing cap 7, as shown in Fig. 5 of the drawings, which causes insertion of the frusto-conical ends 14a of the crank 14, into the bore portion of the shaft 4, and into engagement with the bolt 2a, which causes reciprocal movement of the gear 2 longitudinally of the shaft 4 and laterally of the shaft of the motor 1, which disengages the gear 2 from the pinion 3. When the handle 14 is fully inserted, the ends of the pin 17 engage the notch portions 4a of the shaft 4, and the collars 18 and 19 maintain longitudinal disposition of the crank 14 with respect to the shaft 4, while the bearing 15 provides for freedom of action in rotating the crank 14 for actuating the jack screw 10 relative to the nut 11.

It will be here noted that another important function of the slotted portion 12b of the actuator member 12 is to permit the travel of the actuator member 12 a certain distance longitudinally of the screw 10, so that thread bearing may be gained within the nut 11, permitting the substantial engagement of the screw 10 with the nut 11 before the actuator member 12 contacts the pin 13 and begins to exert force upon the load or weight of the bed structure in connection with the pin 13.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an actuator for power operated adjustable bed, a motor, gear means in connection with said motor, a rotatably mounted shaft in connection with said gear means, a jack screw having an externally screw threaded portion diametrically tapered in converging relationship toward its opposite ends, means connecting said jack screw to said shaft for rotation of the former by the latter, an actuator member having an internally screw threaded nut cooperating with said diametrically tapered screw threaded portion for moving said actuator member longitudinally a predetermined amount, said nut conforming to said externally screw threaded portion of said jack screw, having outwardly diverging portions at opposite ends thereof, substantially conforming to the external diametrical taper at opposite ends of said screw threaded portion of said jack screw whereby said nut automatically stops movement longitudinally of said screw when moved a certain distance in one direction.

2. In an actuator for power operated adjustable bed, a motor, gear means in connection with said motor, a rotatably mounted shaft in connection with said gear means, a jack screw having an externally screw threaded portion diametrically tapered in converging relationship toward its opposite ends, means connecting said jack screw to said shaft for rotation of the former by the latter, an actuator member having an internally screw threaded nut cooperating with said diametrically tapered screw threaded portion for moving said actuator member longitudinally a predetermined amount, said nut conforming to said externally screw threaded portion of said jack screw, having outward diverging portions at opposite ends thereof, substantially conforming to the external diametrical taper at opposite ends of said screw threaded portion of said jack screw whereby said nut automatically stops movement longitudinally of said screw when moved a certain distance in one direction, a spring abutted longitudinally of said jack screw and engageable with said actuator member when moved in one direction relative to the longitudinal axis of said jack screw and exerting its bias for effecting ready engagement of the threads of the screw threaded portion and the nut.

3. In an actuator for power operated adjustable bed, a motor, gear means in connection with said motor, a rotatably mounted shaft in connection with said gear means, a jack screw having an externally screw threaded portion diametrically tapered in converging relationship toward its opposite ends, means connecting said jack screw to said shaft for rotation of the former by the latter, an actuator member having an internally screw threaded nut cooperating with said diametrically tapered screw threaded portion for moving said actuator member longitudinally a predetermined amount, said nut conforming to said externally screw threaded portion of said jack screw, having outwardly diverging portions at opposite ends thereof, substantially conforming to the external diametrical taper at opposite ends of said screw threaded portion of said jack screw whereby said nut automatically stops movement longitudinally of said screw when moved a certain distance in one direction, a spring abutted longitudinally of said jack screw and engageable with said actuator member when moved in one direction relative to the longitudinal axis of said jack screw and exerting its bias for effecting ready engagement of the threads of the screw threaded portion and the nut, said actuator bar having a longitudinally slotted portion therein, and a pin, positioned in said slotted portion, adapted to be connected with an adjustable portion of a conventional power operated adjustable bed.

4. In a power operated adjustable bed, a manual operating handle having a frusto-conical end portion, a pin extending transversely therethrough in spaced relationship to said frusto-conical end portion, a hollow shaft, in which said frusto-conical end portion is insertable, a gear on said hollow shaft having a pin in connection therewith, extending through said hollow shaft, a slot in opposite side walls of said hollow shaft, through which said bolt extends, notches in said hollow shaft, engageable with the pins on said manual operating handle, said frusto-conical end portion of said handle engageable with said bolt connected to said gear.

5. In a power operated adjustable bed, a manual operating handle having a frusto-conical end portion, a pin extending transversely therethrough, in spaced relationship to said frusto-conical end portion, a hollow shaft, in which said frusto-conical end portion is insertable, a gear on said hollow shaft having a pin in connection therewith, extending through said hollow shaft, a slot in opposite side walls of said hollow shaft, through which said bolt extends, notches in said hollow shaft, engageable with the pins on said manual operating handle, said frusto-conical end portion of said handle engageable with said bolt connected to said gear, a pair of collars on said handle, spaced from said pin, a bearing support adjacent one of said collars, a bearing in said bearing support, engaged by the other of said collars, and means engageable by said bearing support for holding said manual operating handle in certain position relative to said hollow shaft.

GRAHAM D. McVICKER.

REFERENCES CITED

The following references are of record in the file of this patent:

UNITED STATES PATENTS

| Number | Name | Date |
| --- | --- | --- |
| 1,416,182 | Farmer | May 16, 1922 |
| 1,858,624 | Hess et al. | May 17, 1932 |
| 2,349,332 | Angell | May 23, 1944 |

FOREIGN PATENTS

| Number | Country | Date |
| --- | --- | --- |
| 10,396 | Great Britain | Aug. 13, 1886 |
| 12,524 | Great Britain | Oct. 2, 1886 |